(12) United States Patent
Kishikawa et al.

(10) Patent No.: US 9,710,956 B2
(45) Date of Patent: Jul. 18, 2017

(54) THREE-DIMENSIONAL MAP DISPLAY SYSTEM

(71) Applicant: GEO TECHINICAL LABORATORY CO., LTD., Fukuoka-shi, Fukuoka (JP)

(72) Inventors: Kiyonari Kishikawa, Fukuoka (JP); Eiji Teshima, Fukuoka (JP); Masatoshi Aramaki, Fukuoka (JP); Masashi Uchinoumi, Fukuoka (JP); Masaru Nakagami, Fukuoka (JP); Tatsuya Azakami, Fukuoka (JP); Tatsurou Yonekura, Fukuoka (JP)

(73) Assignee: GEO TECHNICAL LABORATORY CO., LTD., Fukuoka-Shi, Fukuoka ( * ) Notice: Subject to any disclaimer, the term of this patent is extended or adjusted under 35 U.S.C. 154(b) by 0 days.

(21) Appl. No.: 14/860,591

(22) Filed: Sep. 21, 2015

(65) Prior Publication Data

US 2016/0012632 A1 Jan. 14, 2016

Related U.S. Application Data

(63) Continuation of application No. PCT/JP2014/001323, filed on Mar. 10, 2014.

(30) Foreign Application Priority Data

Mar. 25, 2013 (JP) .................................. 2013-061216

(51) Int. Cl.
| | |
|---|---|
| G01C 21/00 | (2006.01) |
| G06K 9/34 | (2006.01) |
| G06T 15/20 | (2011.01) |
| G06T 17/05 | (2011.01) |
| G06T 7/00 | (2017.01) |
| G09B 29/00 | (2006.01) |
| G06F 3/00 | (2006.01) |
| G09B 29/10 | (2006.01) |

(Continued)

(52) U.S. Cl.
CPC .............. *G06T 15/20* (2013.01); *G01C 21/00* (2013.01); *G06F 3/00* (2013.01); *G06K 9/34* (2013.01);

(Continued)

(58) Field of Classification Search
None
See application file for complete search history.

(56) References Cited

U.S. PATENT DOCUMENTS

| | | | | |
|---|---|---|---|---|
| 2011/0054778 | A1* | 3/2011 | Poiesz ................ | G01C 21/3635 701/533 |
| 2014/0184591 | A1* | 7/2014 | Boschker ................ | G06T 15/50 345/419 |

FOREIGN PATENT DOCUMENTS

| | | |
|---|---|---|
| EP | 2221769 | 8/2010 |
| JP | 10-230075 | 9/1998 |

(Continued)

OTHER PUBLICATIONS

"How to solve Z-fighting", downloaded @ https://www.gamedev.net/topic/450278-how-to-solve-z-fighting, available online since Jun. 1, 2007.*

(Continued)

*Primary Examiner* — Yingchun He
(74) *Attorney, Agent, or Firm* — Beyer Law Group LLP

(57) ABSTRACT

A map database stores three-dimensional polygons of features, as well as water system polygons such as sea and lake and ground surface polygons. The map database stores map data in multiple levels having different levels of details, such as levels LVa to LVc. A procedure of displaying a three-dimensional map offsets the water systems relative to the ground surfaces, draws a map of a distant view area distant away from the viewpoint using map data at a low level of details, subsequently clears a depth buffer and newly draws a map of a close view area close to the viewpoint using map data at a high level of details. The offset is set to increase in the distant view area and decrease in the close view area. Increasing the offset in the distant view area avoids the occurrence of Z-fighting in the distant area from the viewpoint.

10 Claims, 8 Drawing Sheets

(51) Int. Cl.
  *G06T 7/536* (2017.01)
  *G06T 9/20* (2006.01)
  *G06T 15/40* (2011.01)

(52) U.S. Cl.
  CPC ............... *G06T 7/536* (2017.01); *G06T 9/20* (2013.01); *G06T 15/405* (2013.01); *G06T 17/05* (2013.01); *G09B 29/00* (2013.01); *G09B 29/005* (2013.01); *G09B 29/106* (2013.01); *G06T 2200/04* (2013.01); *G06T 2207/30184* (2013.01); *G06T 2207/30188* (2013.01); *G06T 2210/36* (2013.01); *G06T 2210/61* (2013.01); *G06T 2210/62* (2013.01); *G06T 2219/2004* (2013.01); *G06T 2219/2021* (2013.01)

(56) References Cited

FOREIGN PATENT DOCUMENTS

| | | |
|---|---|---|
| JP | 2000-306073 | 11/2000 |
| JP | 2002-042162 | 2/2002 |
| JP | 2006-259035 | 9/2006 |
| WO | 2011/124276 | 10/2011 |

OTHER PUBLICATIONS

Search Report dated Jun. 3, 2014 from International Application No. PCT/JP2014/001323.
European Search Report from European Application No. 1477677 dated Mar. 17, 2017.
Johansson et al. "From CAD to VR—Implementations for Urban Planning and Building Design", 23rd eCAADe Conference Proceedings, vol. 23, 2005.
Giegl et al. "Unpopping: Solving the Image-Space Blend Problem", http://citeseerx.ist.psu.edu/viewdoc/download?doi=10.1.1.137.9531&rep=rep1&type=pdf.
Andrei et al. "Efficient Terrain & Ocean Rendering for a Real Size Planet", SIGGRAPH, 2012.
Soderberg et al. "Image Generation Design for Ground-based Network Training Environments", Virtual Reality Annual International Symposium, 1993.
Anonymous "Z-fighting", http://en.wikipedia.org/wiki/Z-fighting, downloaded on Feb. 27, 2017.

* cited by examiner

THREE-DIMENSIONAL MAP DISPLAY SYSTEM

CLAIM OF PRIORITY

This application is a Continuation of International Patent Application No. PCT/JP2014/001323, filed on Mar. 10, 2014, which claims priority to Japanese Patent Application No. 2013-061216, filed on Mar. 25, 2013, each of which is hereby incorporated by reference.

BACKGROUND OF THE INVENTION

1. Field of the Invention

The present invention relates to a three-dimensional map display system that displays a three-dimensional map.

2. Description of the Related Art

An electronic map displayed on the screen of, for example, a navigation system or a computer may be a three-dimensional map that expresses features such as buildings three-dimensionally. The three-dimensional map is generally displayed by drawing three-dimensional models by, for example, perspective projection. In the three-dimensional map, the ground surfaces and water systems such as sea are expressed by three-dimensional polygons as described below.

Japanese Patent Laid-Open Application No. JP 2000-306073A discloses a technique of generating and displaying ground surface polygons and sea surface polygons from altitude data provided in meshes. Japanese Patent Laid-Open Application No. JP 2006-259035A discloses a technique of generating a ground surface polygon, painting parts other than the ground surface with the same background color as that of the ground surface, and displaying a water system polygon over the ground surface polygon, so as to make misalignment at the boundary between the ground surface and the water system less noticeable.

BRIEF DESCRIPTION OF THE INVENTION

A process of displaying a three-dimensional map by perspective projection specifies the depth relationship and performs hidden line removal. In an overlapped area where a ground surface polygon and a water system polygon are drawn in an overlapping manner at the boundary between the ground surface and the water system, two polygons are present at substantially the same height. This leads to the phenomenon called Z-fighting that causes unstable specification of the depth relationship and may cause a trouble such as image flickering. This phenomenon is not limited to the boundary between the ground surface and the water system but commonly occurs in an overlapped area of polygons of the same height. By taking into account such problems, an object of the invention is to avoid the occurrence of Z-fighting in an overlapped area where a plurality of polygons are drawn in an overlapping manner in display of a three-dimensional map.

According to one embodiment of the invention, there is provided a three-dimensional map display system that displays a three-dimensional map, comprising: a map database that stores three-dimensional polygon data representing geography and a three-dimensional shape of each feature; an offset setting section that performs an offset process in an overlapping area of a first polygon and a second polygon representing substantially horizontal planes to shift the first polygon and the second polygon relative to each other in a height direction, so as to make a height difference between the first polygon and the second polygon; and a drawing controller that uses the three-dimensional polygon data and polygons processed by the offset setting section to draw the three-dimensional map by perspective projection viewed from a specified viewpoint position and in a specified gaze direction. The offset setting section shifts the first polygon and the second polygon to increase the height difference at a distant point from the viewpoint in the perspective projection than a close point to the viewpoint.

The embodiment of the invention relatively shifts the first polygon and the second polygon and thereby suppresses the occurrence of Z-fighting. Increasing the offset at the point distant from the viewpoint advantageously suppresses the occurrence of Z-fighting as described below.

FIG. 1 is a diagram illustrating the advantageous effects by offsetting. In an illustrated three-dimensional map, a sea polygon is drawn in a partly overlapping manner over a ground surface polygon generated as a three-dimensional polygon. The ground surface polygon and the sea polygon are both polygons representing substantially horizontal planes and accordingly correspond to the first polygon and the second polygon of the invention. Z-fighting that causes unstable specification of depth relationship may occur at the boundary between the ground surface polygon and the sea polygon.

A technique for avoiding this problem entirely shifts the sea polygon upward by an offset Ha (m). The state in an area A after the offset is shown in the lower portion of the illustration. As illustrated, a clearance that is not actually present is generated between the ground surface polygon and the sea polygon by offsetting the sea polygon. This, however, clarifies a difference in height between the ground surface polygon and the sea polygon and thus avoids the occurrence of Z-fighting. The above clearance does not cause a problem as long as the map is drawn in the gaze direction looking down from the upper viewpoint.

In the case of drawing by perspective projection, however, a distant area distant away from the viewpoint, for example, an area B, has very small vertical and horizontal display scales, so that offsetting by the height Ha (m) may make substantially no difference in display. Z-fighting that specifies the depth relationship in the viewing area may thus be unavoidable in the distant area B.

When the offset is set to such a value that avoids the occurrence of Z-fighting in the distant area B in order to avoid this problem, on the contrary, the offset may be as large as several hundred meters. Such a large offset makes the offset-induced clearance visible in the close area A and causes an inaccurate display.

In order to avoid the problems described above, one embodiment of the invention changes the offset, such that the offset decreases in the closer area and increases in the more distant area. This avoids the occurrence of Z-fighting in the distant area, while ensuring an adequate display in the close area.

FIG. 1 illustrates the example of the ground surface polygon and the sea polygon, but the invention is not limited to these polygons but is applicable to a variety of polygons.

According to one embodiment of the invention, the change in offset described above may be implemented by a variety of aspects. For example, the offset may be provided by a function or by a map according to the distance from the viewpoint.

According to another aspect, the map database may store the three-dimensional polygon data by dividing into meshes of a predetermined geographical size, and the offset setting section may shift the first polygon and the second polygon with respect to each of the meshes. This reduces the load of computing the offset at each point. The offset with respect to each mesh may be specified in advance by, for example, a table according to the distance from the viewpoint.

Providing the offset with respect to each mesh results in chanting the offset in a step-like way and causes a clearance at a boundary of meshes. In order to prevent such a clearance from being visible, for example, one applicable method may employ the same color for the background color in drawing and the polygon as the object of offset. Another applicable method may generate a vertical virtual polygon to cover the clearance.

According to another aspect, the offset setting section may perform the offset process with decreasing a shifting amount in the height direction at a boundary of meshes from a distant view area distant away from the viewpoint position toward a close view area close to the viewpoint position. The drawing controller may draw a map with respect to each area subjected to the offset process with an identical shifting amount in order of decreasing the shifting amount of the area in the height direction, and may draw a new area over a previously drawn map, irrespective of a value of display depth at each point on the previously drawn map.

This aspect draws the map in the order of decreasing the shifting amount, i.e., from the distant view area toward the close view area, without determining the display depth relative to a previously drawn map in the process of drawing the close view area close to the viewpoint. In other words, in the case of drawing the close view area, the distant view area is treated as the two-dimensional background. This avoids generation of a clearance visible from the viewpoint position even when a larger offset is set for the distant view area. For example, an available technique of avoiding determination of the display depth clears a Z-buffer after drawing a distant view area.

In the case of changing the offset in the mesh unit, the one embodiment of invention may concurrently use a plurality of different types of map data as described below.

The map database may store map data for displaying the three-dimensional map at each of multiple levels having different levels of map details. The drawing controller may concurrently use map data in a plurality of different levels to draw a map, such that map data at a rougher level having a lower level of map details is used for a more distant view area distant away from the viewpoint position and map data at a finer level having a higher level of map details is used for a closer view area closer to the viewpoint position.

The offset setting section may shift the first polygon and the second polygon at each of the multiple levels, before drawing the map at the each level. Map data in each level may be stored in division into meshes.

This aspect performs the offset process with respect to each level. Since the map data at each level is divided into meshes, this aspect also advantageously reduces the computation load relating to offsetting, like the offset process in the units of meshes. Drawing with sequentially changing the offset from the distant view area toward the close view area avoids generation of a clearance caused by a step-like change in offset.

When the plurality of different types of map data are used concurrently, the size of meshes differs according to the level of details. Map data of different levels are thus drawn in an overlapping manner at the boundary between the map data of different levels used for drawing. The embodiment of the invention does not determine the display depth relative to the previously drawn map after changing the level as described above. This avoids the occurrence of Z-fighting even in an overlapped area of the map data of different levels. Additionally, using the map data at the rough level for the distant view area reduces the processing load required for drawing a map.

The invention may be applied to a variety of polygons.

According to one aspect, the map database may include three-dimensional polygon data representing a ground surface and three-dimensional polygon data representing a water system which is to be drawn to entirely or partly cover the ground surface, and the offset setting section may shift the water system to a higher position relative to the ground surface. This corresponds to the aspect illustrated in FIG. 1. The ground surface and the water system are often drawn across a wide range from a close area close toward the viewpoint to a distant area in a three-dimensional map and are likely to cause the problem of Z-fighting. The invention is thus especially effective for these polygons.

The invention may not necessarily include all the variety of features described above but may be configured appropriately with partial omission or by combination of these features. One embodiment of the invention may also be configured as a three-dimensional map display method performed by a computer to display a three-dimensional map and as a computer program that causes a computer to display a three-dimensional map. One embodiment of the invention may also be configured as a computer-readable non-transitory storage medium in which such a computer program is stored.

When one embodiment of the invention is configured as a computer program or as a non-transitory storage medium in which such a computer program is stored, the configuration may include the entire program that controls the operations of the three-dimensional image output device or the background image generation device or may include only a section that achieves the functions of the embodiments of the invention. Available examples of the storage medium include flexible disks, CD-ROMs, DVD-ROMs, magneto-optical disks, IC cards, ROM cartridges, punched cards, prints with barcodes or other codes printed thereon, internal storage units (memories such as RAM and ROM) and external storage units of computers and various other computer-readable media.

DETAILED DESCRIPTION OF EMBODIMENTS OF THE INVENTION

First Embodiment

The following describes an embodiment of the invention configured as a three-dimensional map display system by using a personal computer to display a three-dimensional map on its display. The invention may also be applied to an aspect incorporated as a three-dimensional map display function in another device, such as a route searching/route guide device.

A. System Configuration

Figure 1:
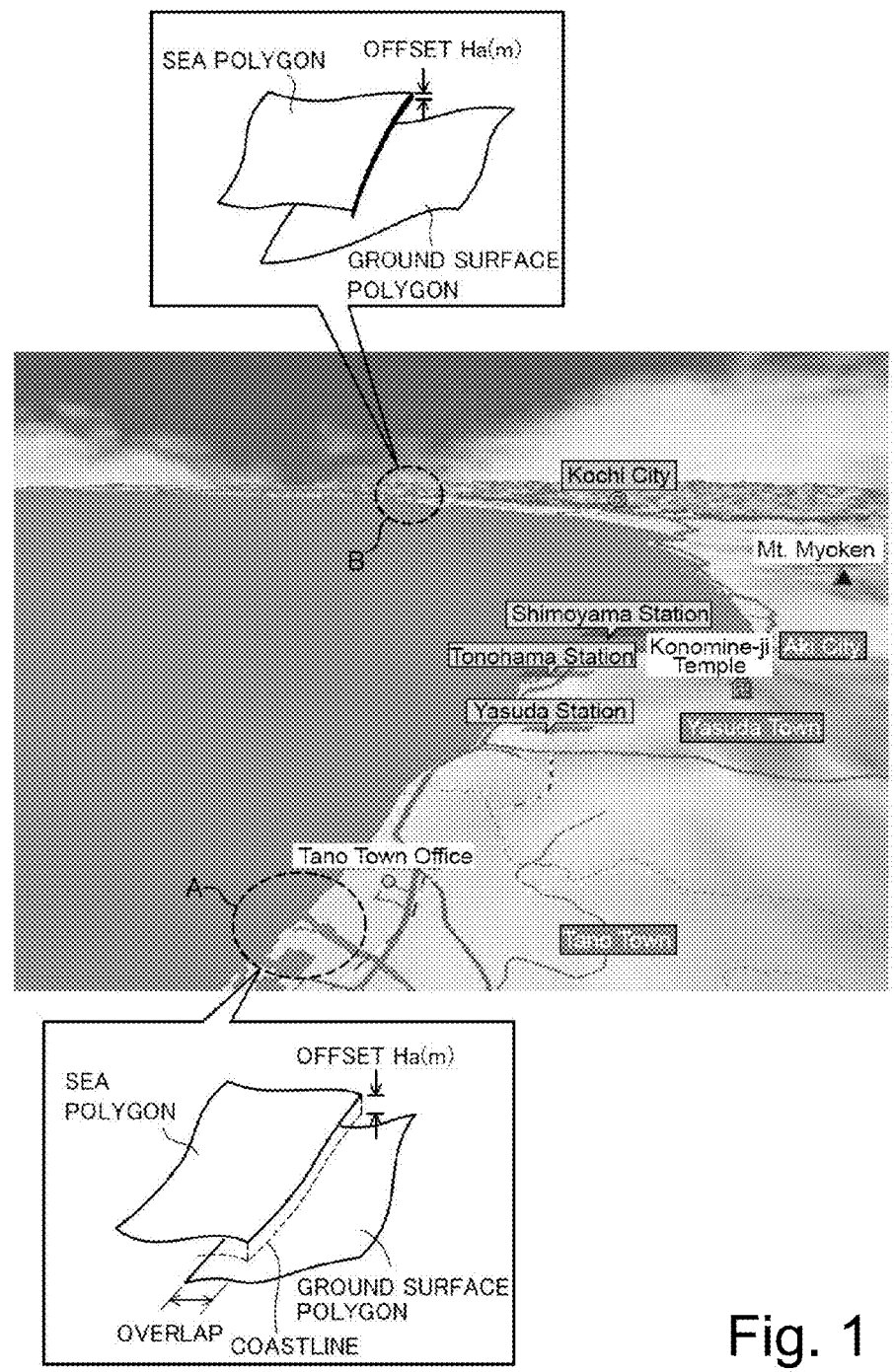
FIG. 1 is a diagram illustrating the advantageous effects by offsetting.
Figure 2:
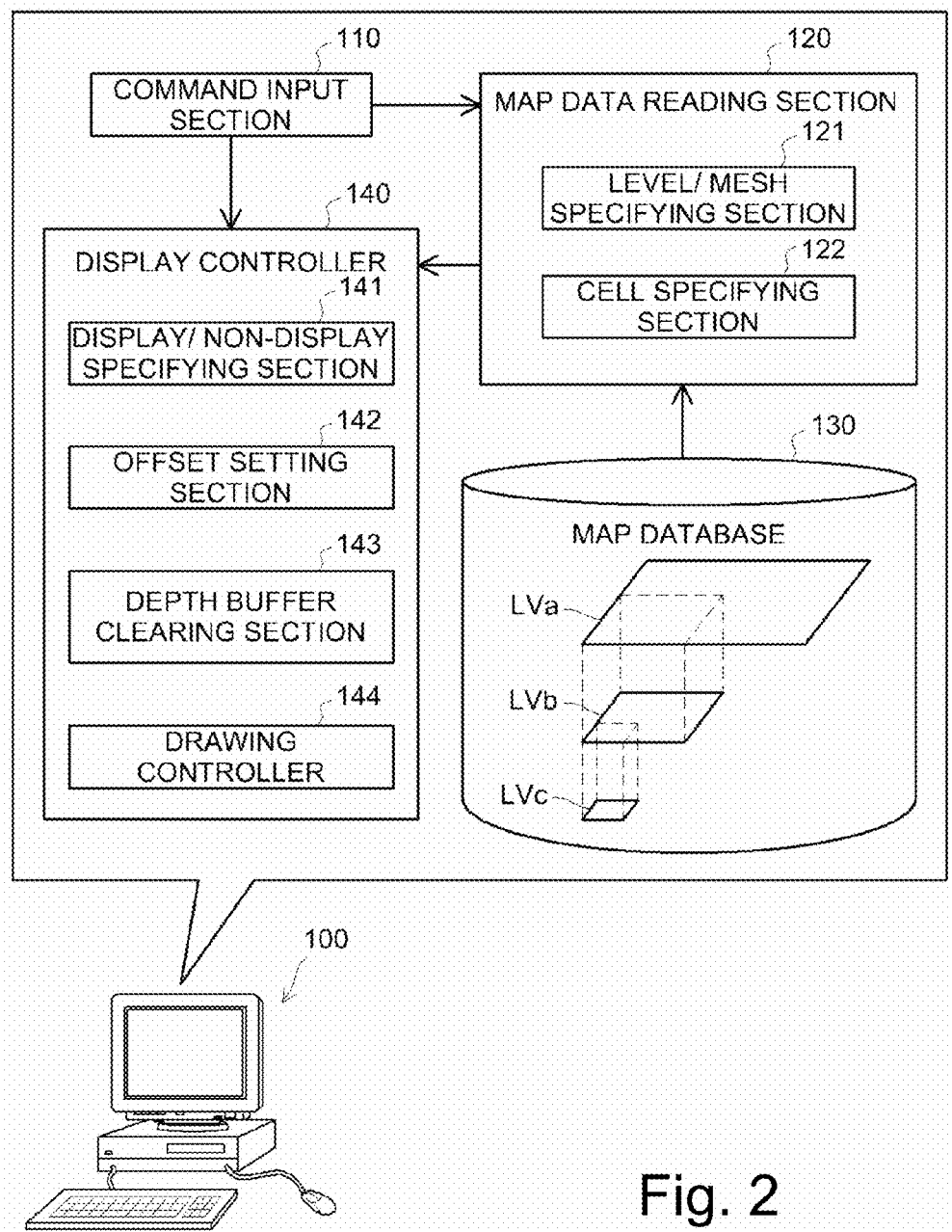
FIG. 2 is a diagram illustrating the configuration of a three-dimensional map display system.

FIG. 2 is a diagram illustrating the configuration of a three-dimensional map display system 100. The three-dimensional map display system 100 is provided as a system configured by using a personal computer to display a three-dimensional map on its display, in response to a user's instruction. This embodiment illustrates a standalone-type system using a personal computer, but the three-dimensional map display system 100 may be configured as a system in which a server storing a map database 130 and other required data is connected with a personal computer by a network. The terminal used to display a map is not limited to the personal computer but may be any of various terminals, for example, a tablet terminal, a cell phone or a smartphone.

The three-dimensional map display system 100 has a variety of functional blocks as illustrated. These functional blocks may be configured by installing software implementing the respective functions but may be partly or wholly configured by hardware.

The map database 130 stores map data including three-dimensional models indicating, for example, three-dimensional shapes of features, in order to display a three-dimensional map. According to this embodiment, the map data are stored divisionally in multiple levels LVa to LVc as illustrated. Data in each level is managed by dividing into a predetermined size of meshes. The level LVc stores data having the highest level of details, i.e., even data of narrow streets and small features. The level LVc indispensably has the large data volume and is thus managed by dividing into relatively small meshes. The level LVb has the slightly lower level of details than the level LVc. The level LVb stores data of standard-size roads and buildings with omission of data such as narrow streets. The mesh size of the level LVb is set larger than that of the level LVc. The level LVa has the further lower level of details and stores data of, for example, only main roads such as expressways and main buildings recognized as landmarks. The mesh size of the level LVa is set further larger than that of the level LVb.

The map data are stored divisionally in multiple levels as described above, but data of each feature is not selectively stored in one of these levels. For example, a main building recognized as a landmark is commonly stored in all the levels LVa to LVc. In other words, data in each level is capable of being used to display a map at the level of details corresponding to the level. According to this embodiment, the map data are managed by cells as subdivisions of meshes. This cell structure will be described later.

A command input section 110 receives a user's instructions regarding display of a three-dimensional map. The user's instructions include, for example, instructions for displaying a map such as viewpoint position, gaze direction and display range (scale).

A map data reading section 120 serves to read map data from the map database 130. A level/mesh specifying section 121 specifies which level and which mesh of data are to be used in the map database 130 according to the user's instructions such as the viewpoint position. A cell specifying section 122 specifies which cell of data are to be used in the mesh specified by the level/mesh specifying section 121. The map data reading section 120 reads data for displaying a map from the specified mesh and the specified cell. According to this embodiment, map data in multiple levels are used in combination to display one three-dimensional map. Controlling combined use of map data will be described later.

A display controller 140 displays a three-dimensional map using the map data of the map database 130. According to this embodiment, a procedure divides a map into a plurality of areas according to the distance from the viewpoint position and uses map data of different levels for the respective areas to display a three-dimensional map as described below.

A display/non-display specifying section 141 specifies display or non-display of each feature stored in the map data according to the distance from the viewpoint position.

An offset setting section 142 sets an offset. An offset process is a process of shifting a polygon representing the sea in a height direction from the value stored in the map database 130. The offset herein means a shifting amount. Different values are assigned to offsets for the respective areas, such that the offset decreases with a decrease in distance of the area from the viewpoint. The method of setting an offset will be described later.

A depth buffer clearing section 143 initializes the value of a depth buffer used for hidden line removal during map drawing whenever drawing in an area is completed. This process causes the drawn area to constitute one two-dimensional background image without three-dimensional significance.

A drawing controller 144 uses map data to draw a map by perspective projection with respect to each area in the order of decreasing the distance of the area from the viewpoint. Hidden line removal is performed using the depth buffer in the course of drawing each area. Drawing is performed for a next area after initialization of the depth buffer as explained above. In the process of drawing this next area, the display depth is newly stored in the depth buffer, and hidden line removal is performed based on this storage. A previously drawn area is treated merely as the background image, so that a new area is drawn over the image of the existing area previously drawn.

B. Configuration of Map Database

The following describes the configuration of the map database according to the embodiment. As described previously, according to this embodiment, the map data are provided in multiple levels having different levels of details (FIG. 2). At each level, the map data are stored in units of meshes of a predetermined geographical size. In each mesh, cells are defined as divisions of the mesh, based on the sizes of respective features to be stored and their data volumes, so that data are stored in units of cells. The following first describes the concept of cells and subsequently describes the data structure.

Figure 3:
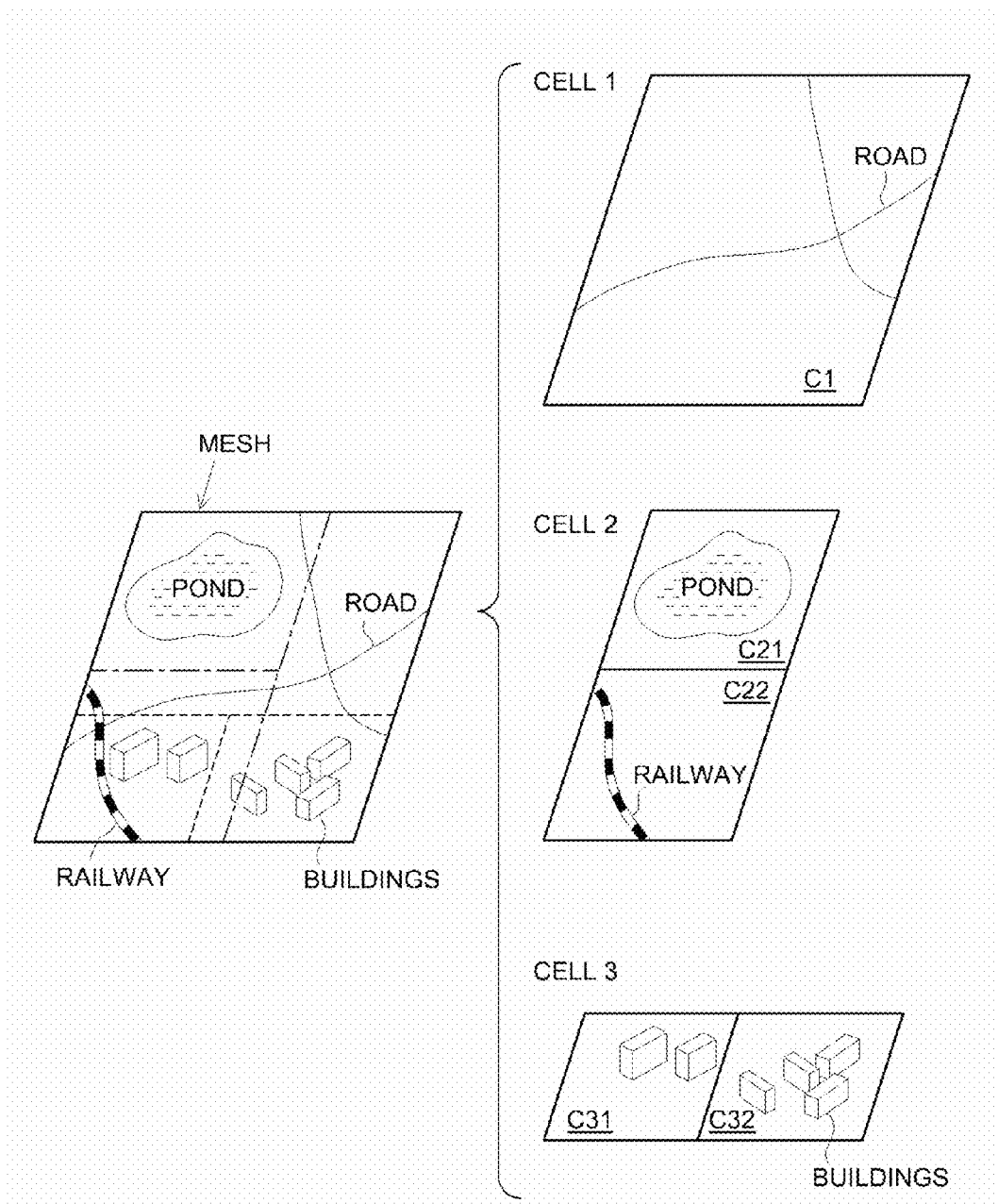
FIG. 3 is a diagram illustrating the cell structure of a map database.

FIG. 3 is a diagram illustrating the cell structure of the map database. The left-side illustration is an example of a mesh constituting map data. Feature data representing the shapes of various features are stored in a mesh. In the illustrated example, feature data of a pond, a road, a railway and a plurality of buildings are stored in the mesh. The respective features have different two-dimensional sizes. For example, the road is a "long" feature located over substantially the entire area in the mesh. Such features of relatively large two-dimensional sizes are called large-size features herein. The pond and the railway are features of medium sizes which occupy relatively wide areas in the mesh (hereinafter called "medium-size features"). Classification between the large-size features and the medium-size features is not unequivocally determined by the attributes of the features but is determinable based on the actual sizes of the respective features occupying in the mesh. For example, when there is a larger pond than that shown in FIG. 3, the pond may be classified as a large-size feature. Buildings and other features of relatively small two-dimensional sizes, other than these large-size features and medium-size features, are specified as small-size features.

This embodiment classifies the features by the two-dimensional size as described above and subsequently sets cells as units for management of the features.

A cell 1 (C1) having the same size as that of the mesh is set for large-size features, as shown in the right-side illustration. Two cells 2 (C21 and C22) having the smaller size than that of the mesh are set for medium-size features. Alternatively a cell having the total size of the cells C21 and C21 may be used for the medium-size features. Whether or not the cell 2 is to be divided into two cells C21 and C21 is based on determination of whether the data volume included in each cell exceeds a predetermined upper limit. When the total data volume of the feature data of the pond and the railway exceeds the upper limit set for the cell 2, the feature data are divided into the two cells C21 and C22 to be managed. When the total data volume does not exceed the upper limit, on the other hand, the feature data are managed in one single cell having the total size of the cells C21 and C22. In this way, the shapes of the cells C21 and C22 are determined, based on the sizes of the features included in the respective cells and the data volumes of the features in the respective cells.

The feature data of small-size features, e.g., buildings, are similarly divided into two cells 3 (C31 and C32) to be managed. The shapes of the cells 31 and 32 are also determined, based on the shapes and the data volumes of the features included in the respective cells. In the illustrated example of FIG. 3, each cell 3 is not set for each building, but two buildings are stored in the cell 31 and four buildings are stored in the cell 32. This indicates that the total data volume of these plurality of buildings stored in each cell does not exceed the upper limit set for the cell.

The one-dot chain lines shown in the left-side illustration indicate the cells 2, and the broken lines indicate the cells 3. In this way, the feature data in one mesh are divided into a plurality of cells to be managed. In the illustrated example of FIG. 3, feature data are classified into three groups of features, i.e., large-size features, medium-size features and small-size features, and cells are set for the respective groups of features. According to a modification, feature data may be classified into two groups of features, i.e., large-size features and small-size features, and cells may be set for only the small-size features.

According to the embodiment, cells are not defined by simply dividing the features in the mesh based on the geographical divisions, but features are classified into a plurality of groups, such as large-size features and small-size features, and cells are set for the respective groups of features. Accordingly, reading only the cells set for any one group of features, for example, reading only the cells 3 for storing small-size features, does not allow for display of a map. It is necessary to read all the cells 1 to 3, in order to display a map appropriately. In the case that the data stored in the cell C31 is sufficient for a certain display range of the map and the data stored in the cells C32 is out of the certain display range, the procedure of the embodiment is enabled to skip reading the cell C32. This reduces the processing load for display a map.

Figure 4:
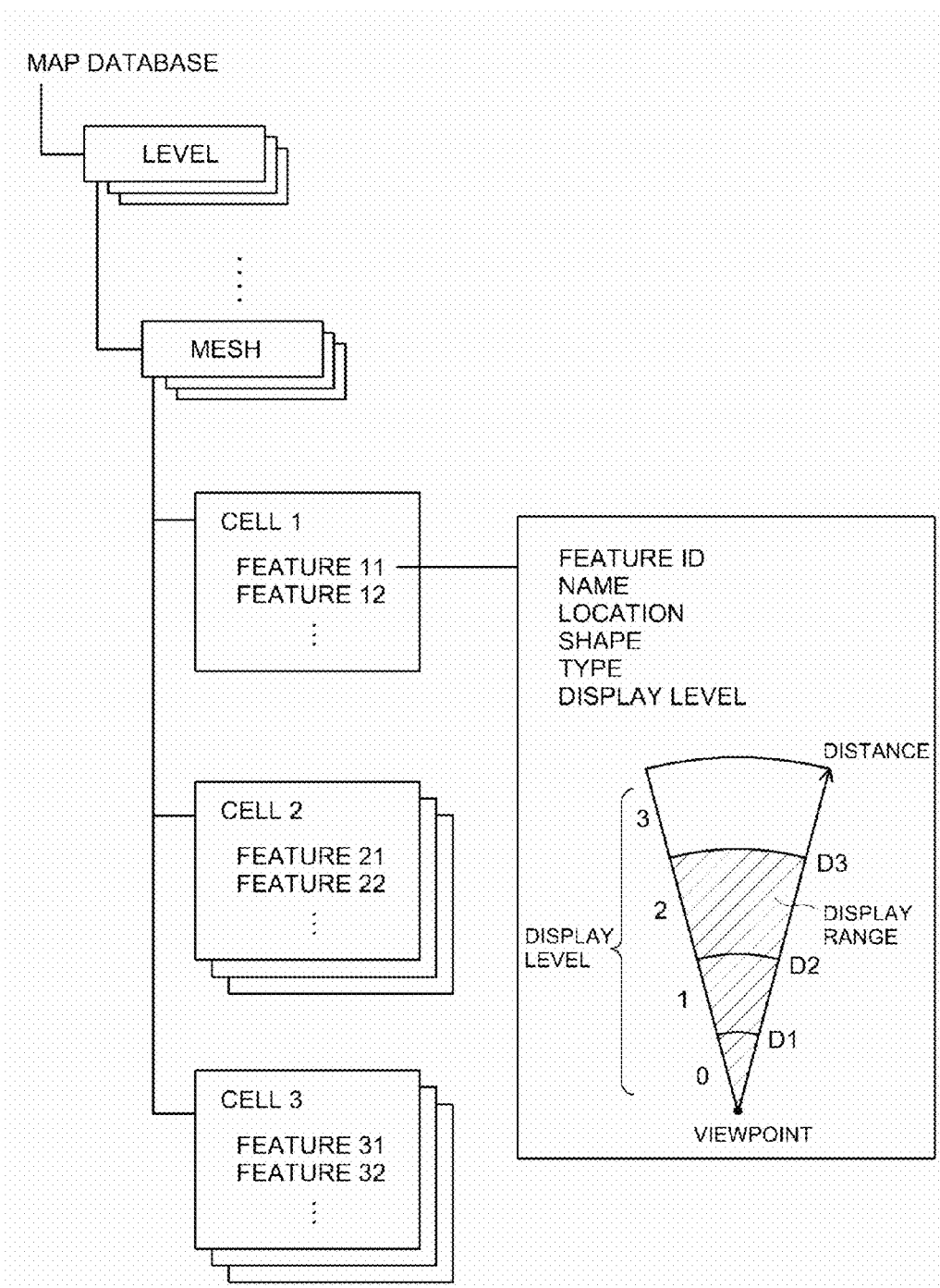
FIG. 4 is a diagram illustrating the data structure of the map database.

FIG. 4 is a diagram illustrating the data structure of the map database. The map database is managed in multiple levels as illustrated in FIG. 2. Data at each level consists of a plurality of meshes of a predetermined geographical size. Each mesh is divided into a cell 1 for storing large-size features, cells 2 for storing medium-size features and cells 3 for storing small-size features as illustrated in FIG. 3. The cells 2 may be omitted as appropriate. The cell structure in four or more levels may be employed.

The data structure for each feature is illustrated with respect to the cell 1 as an example. A variety of data as illustrated are stored for each feature as follows: "Feature ID" indicates unique identification information of a feature; "Name" indicates the name of a feature; "Location" indicates the location of the representative point of a feature. For example, the location may be specified by the coordinate values of the center of gravity in the two-dimensional shape of a feature.

"Shape" is polygon data representing the two-dimensional or three-dimensional shape of a feature; "Type" is information regarding the type of a feature, such as road or building; and "Display Level" is information used to control display/non-display of a feature according to the distance from the viewpoint in display of a map. According to this embodiment, as illustrated, the display level is specified by one of integral values 0 to 3. The display level "0" indicates display of a feature located in the range from the viewpoint to a distance D1 which is relatively close to the viewpoint. Similarly, the display level "1" indicates display of a feature located in the range from the viewpoint to a distance D2, and the display level "2" indicates display of a feature located in the range from the viewpoint to a distance D3. The display level "3" indicates display of a feature irrespective of the distance from the viewpoint, since the upper limit of the distance is not specified.

An example of the display range is shown as a hatched range in the illustration. When the display level "2" is set for a feature, the display range is a shorter range than the distance D3, i.e., the hatched range in the illustration.

C. Map Display Process

The following describes a map display process for displaying a map. This map display process is mainly performed by the display controller 140 shown in FIG. 2 and is performed by the CPU of the map display system 100 as the hardware configuration.

Figure 5:
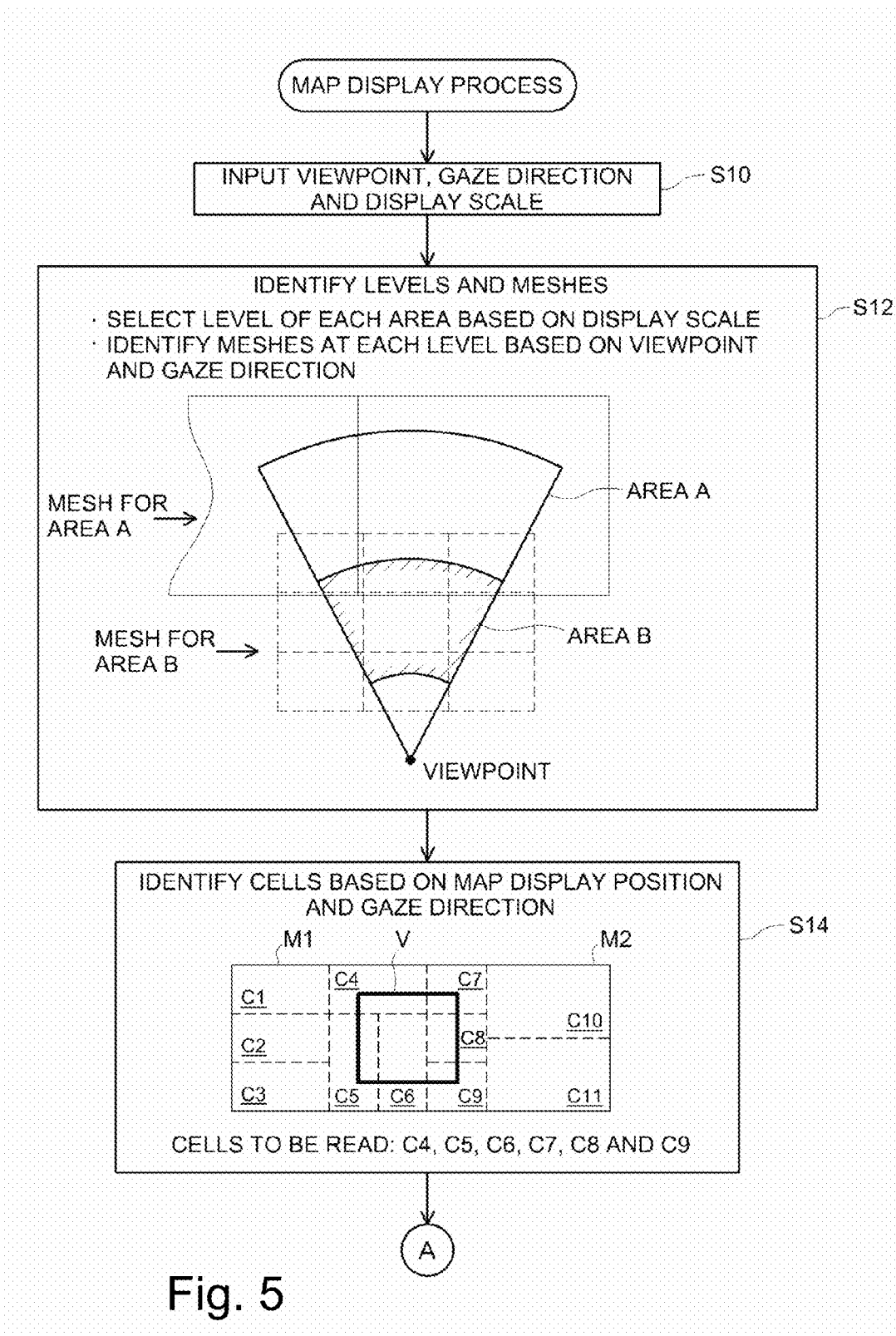
FIG. 5 is a first part of a flowchart of a map display process.
Figure 6:
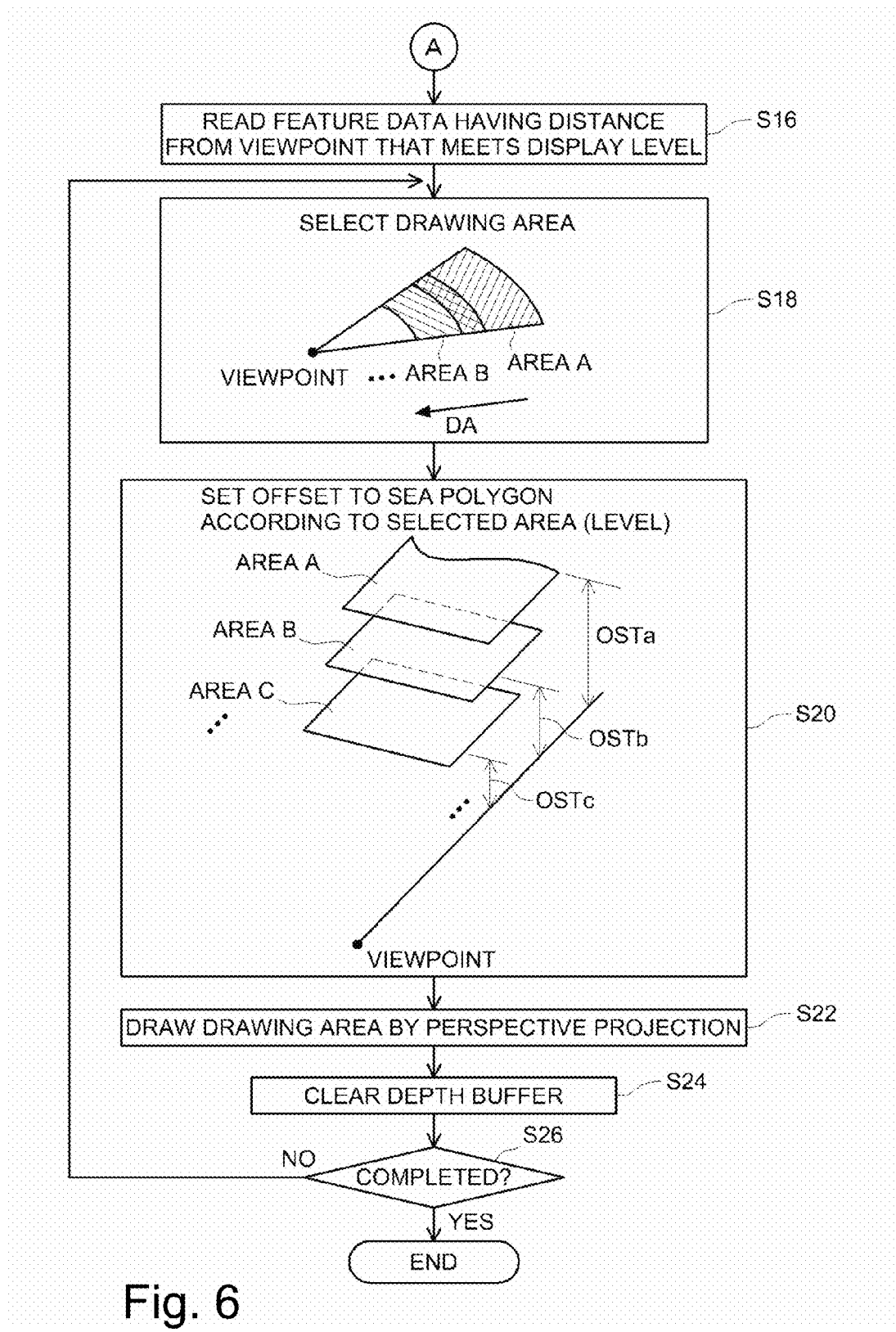
FIG. 6 is a second part of the flowchart of the map display process.

FIGS. 5 and 6 are flowcharts of the map display process. When the map display process is triggered, the CPU of the map display system 100 inputs the user's instructions regarding the viewpoint, the gaze direction and the display scale (step S10). Default settings may be used for these instructions. The CPU subsequently identifies levels and meshes, with respect to which map data are to be read (step S12). A procedure of identifying the meshes is illustrated.

The embodiment concurrently uses map data of different levels for a plurality of areas to display a map. According to this embodiment, the plurality of areas are called area A and area B in the order of decreasing the distance of the area from the viewpoint.

The CPU first identifies the level of each area, based on the display scale specified by the user. For example, when wide area display is specified as the display scale, the level LVa and the level LVb shown in FIG. 2 may be selected respectively for the area A and for the area B. When detailed display is specified as the display scale, on the other hand, the level LVb and the level LVc shown in FIG. 2 may be selected respectively for the area A and for the area B.

After selection of the levels, the CPU identifies meshes as the reading object of map data at each level, based on the viewpoint and the gaze direction. A procedure of identifying the meshes is illustrated. A fan-shaped range starting from the viewpoint is the display range of the map. A hatched area relatively close to the viewpoint is the area B, and a distant white area is the area A.

In the map data at the level selected for the area B, meshes overlapping with the area B, i.e., nine meshes illustrated by the broken lines, are the reading object of map data for the area B. Similarly, with regard to the area A, meshes overlapping with the area A, i.e., two meshes illustrated by the solid lines, are the reading object of map data for the area A.

According to this embodiment, a map image of the area B is drawn over a map image of the area A, as described later. With respect to the area A, it is accordingly not necessary to limit the reading range of map data to the area A. For example, the entire area starting from the vicinity of the viewpoint may be drawn as the area A.

The CPU subsequently identifies cells, with respect to which map data are to be read, based on the map display position and the gaze direction (step S14). A method of identifying the cells is illustrated.

It is here assumed that meshes M1 and M2 are identified as the reading object by the process of step S12. Cells C1 to C6 are defined for the mesh M1 as illustrated by the broken lines. Cells C7 to C11 are defined for the mesh M2 as illustrated by the broken lines. The CPU identifies cells overlapping with a map display range V (this range is illustrated as a rectangle but is technically a fan-shaped area in perspective projection) as the reading object among the cells C1 to C11 included in the meshes M1 and M2. As a result, cells C4 and C9 are identified as the reading object in the illustrated example. This embodiment identifies the reading object in the units of cells and thereby eliminates the need to read the map data of the entire meshes M1 and M2. This advantageously reduces the time required for reading the map data.

The CPU reads feature data having the distance from the viewpoint that meets the display level, from the identified cells (step S16). For example, as shown in FIG. 4, the display level "2" indicates display of a feature located in the range from the viewpoint to the distance D3. When the feature is located farther from the distance D3 from the viewpoint, this feature is excluded from the reading object. The distance from the viewpoint to a feature used for such decision may be calculated individually for each feature or may be calculated using the representative point of a cell (for example, a point on the cell boundary closest to the viewpoint).

Instead of the above process, a modified process may read all feature data from the identified cells and subsequently control display/non-display of each feature based on the display level.

After reading the feature data, the CPU selects a drawing area (step S18). According to this embodiment, drawing is performed in the order of decreasing the distance of the area from the viewpoint as shown by an arrow DA. The CPU thus sequentially selects drawing areas, such that the area A is selected first as a first drawing area to be drawn first, and after completion of drawing of the area A, the area B is subsequently selected as a next drawing area.

The CPU subsequently sets an offset to a sea polygon according to the selected drawing area or its level (step S20). An example of offsets is illustrated. Offsets OSTa, OSTb and OSTc are respectively assigned to areas A, B and C in the order of decreasing the distance from the viewpoint. According to the embodiment, the larger offset is assigned to the area having the greater distance from the viewpoint. Accordingly the offsets satisfy the relation of OSTc<OSTb<OSTa. The values of the respective offsets are determined to suppress the occurrence of Z-fighting in perspective projection. The specific value of the offset for each area is determined, for example, according to the distance of the area from the viewpoint, the viewpoint position, the gaze direction and the resolution of a perspective projection image.

According to this embodiment, the viewpoint and the extent and the location of each drawing area are fixed, regardless of the position of the viewpoint. There is accordingly no need to calculate the offset each time at step S20, but the value provided in advance for each drawing area may be used as the offset.

Upon completion of setting the offset, the CPU uses map data to draw the selected drawing area by perspective projection (step S22). The map data used for this operation is map data at the level specified for the selected drawing area. In the course of this drawing operation, the display depth of each point is stored in the depth buffer, and hidden line removal is performed.

This drawing operation is also controlled not to draw a three-dimensional feature in the vicinity of the boundary between the selected drawing area and another area closer to the viewpoint. A specific procedure of such control may set a non-display area where no feature is to be displayed in the vicinity of the boundary between the selected drawing area and the area closer to the viewpoint and determine whether each feature is included in this non-display area. Another available procedure may not draw any features but draw only a polygon representing the ground surface in a distant area.

Upon completion of drawing, the CPU clears the depth buffer (step S24). This causes the image in the drawn area to merely indicate a two-dimensional background image without information of the display depth.

When drawing of the whole map is not yet completed by the above series of processing (step S26), the CPU selects an adjacent area closer to the viewpoint as a next drawing area (step S18) and repeats the processing of steps S20 to S24 to draw a map.

Since the depth buffer is cleared, a new area is drawn over an existing area previously drawn. The display depth is newly stored in the depth buffer in the course of perspective projection of a new area, so that hidden line removal is adequately performed for this new area.

The following describes the significance of the non-display area set in the process of drawing areas.

This embodiment causes the image of an area closer to the viewpoint to be drawn over the image of an area farther from the viewpoint by clearing the depth buffer as described above. If a three-dimensional feature is drawn in the vicinity of the boundary between these two images, part of the three-dimensional feature may be unnaturally covered by the image of the closer area. As described above, the procedure of the embodiment sets the non-display area in the vicinity of the boundary to prevent any three-dimensional feature from being drawn in the vicinity of the boundary, thus avoiding this potential trouble. The size of the non-display area may be set arbitrarily to achieve this purpose by taking into account the range where the image of the closer area is drawn over the image of the distant area.

The following describes the significance of clearing the depth buffer.

Figure 7A:
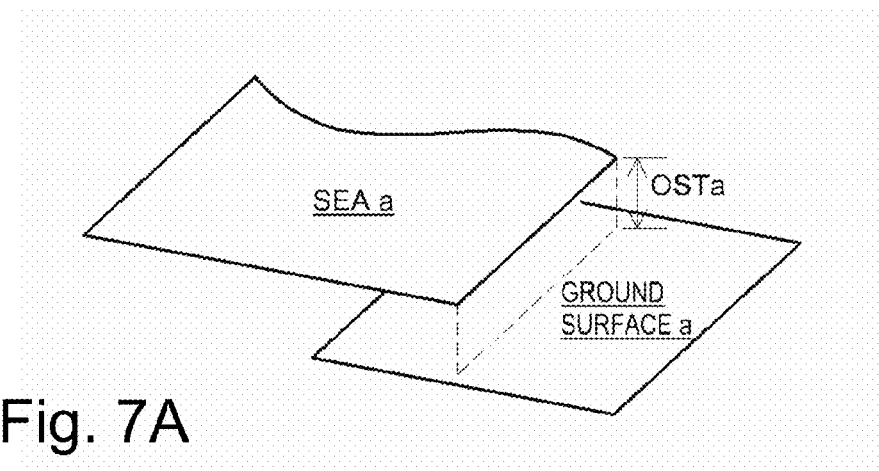
FIG. 7A is a diagram illustrating the advantageous effects of clearing a depth buffer.
Figure 7B:
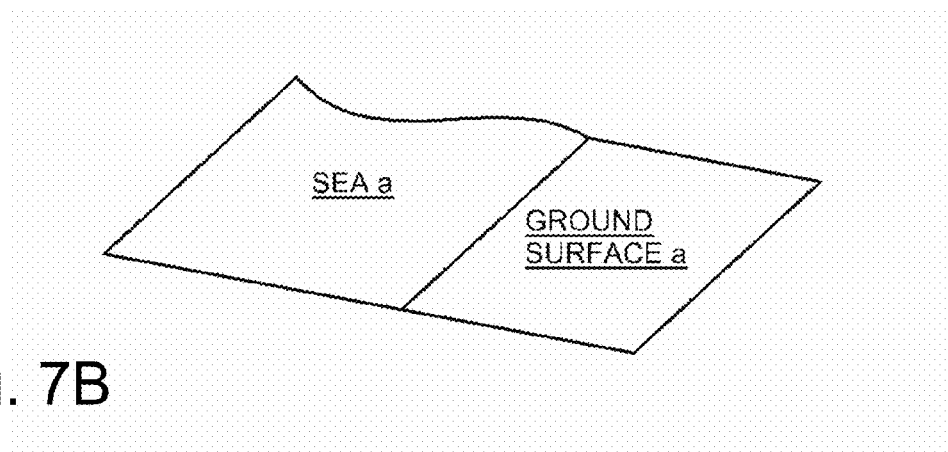
FIG. 7B is a diagram illustrating the advantageous effects of clearing a depth buffer.
Figure 7C:
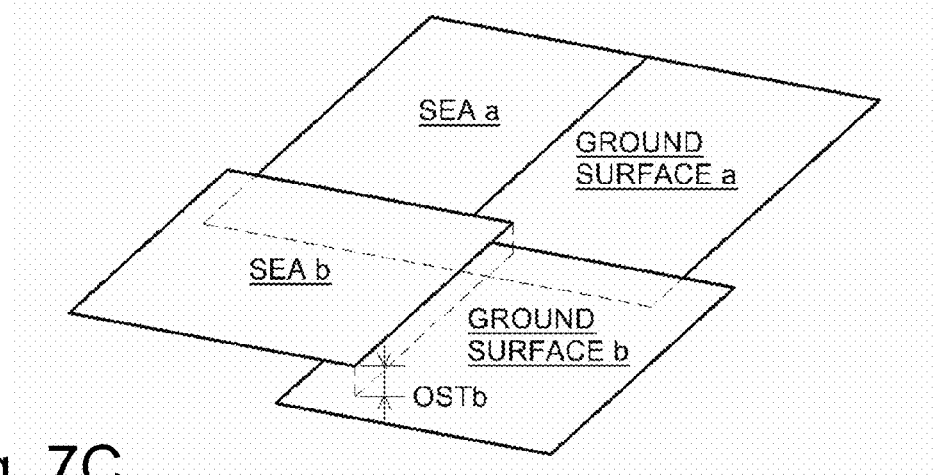
FIG. 7C is a diagram illustrating the advantageous effects of clearing a depth buffer.

FIGS. 7A through 7C are diagrams illustrating the advantageous effects of clearing the depth buffer. FIG. 7A illustrates the state that the area A is drawn. In the process of drawing this area, as shown in step S20 of FIG. 6, a sea polygon (illustrated as sea a) is offset by the height OSTa from a ground surface (illustrated as ground surface a). The sea polygon is accordingly drawn at the floating positional relation above the ground surface as shown in FIG. 7A. Floating the sea polygon in this way avoids Z-fighting between the sea polygon and the ground surface.

Although the sea polygon is drawn at the floating positional relation, the distant offset is hardly visible in perspective projection. The resulting drawing is accordingly in the state that the ground surface a and the sea a form the coastline as shown in FIG. 7B.

The depth buffer is cleared in this state, so that the ground surface a and the sea a are treated merely as the background image in the subsequent drawing.

FIG. 7C illustrates the state that the adjacent area B closer to the viewpoint than the area A is drawn. In the process of drawing this area, as shown in step S20 of FIG. 6, a sea polygon (illustrated as sea b) is offset by the height OSTb from a ground surface (illustrated as ground surface b). The sea b is accordingly drawn at the floating positional relation above the ground surface b as shown in FIG. 7C. The previously drawn sea a and ground surface a are treated merely as the background image by clearing the depth buffer, so that the sea b is drawn over the sea a. According to this embodiment, the offset OSTa for the sea a farther from the viewpoint is set greater than the offset OSTb for the sea b (step S20 in FIG. 6). Clearing the depth buffer, however, avoids a step-like clearance from being generated as shown in step S20 in FIG. 6. The same is applied to drawing an area further closer to the viewpoint than the area B.

Clearing the depth buffer is advantageously effective for not only the offset of the sea polygon but for the ground surface. The procedure of the embodiment concurrently uses map data of different levels for drawing, so that polygons of the ground surfaces, such as the ground surface a and the ground surface b, are partly overlapped in the drawing. In such cases, if the depth buffer is not cleared, Z-fighting may occur to make the image unstable in the area where the ground surface a and the ground surface b overlap each other. The procedure of the embodiment, however, clears the depth buffer and causes the ground surface b to be drawn over the ground surface a. This advantageously avoids Z-fighting.

D. Map Display Process (Modification)

Figure 8:
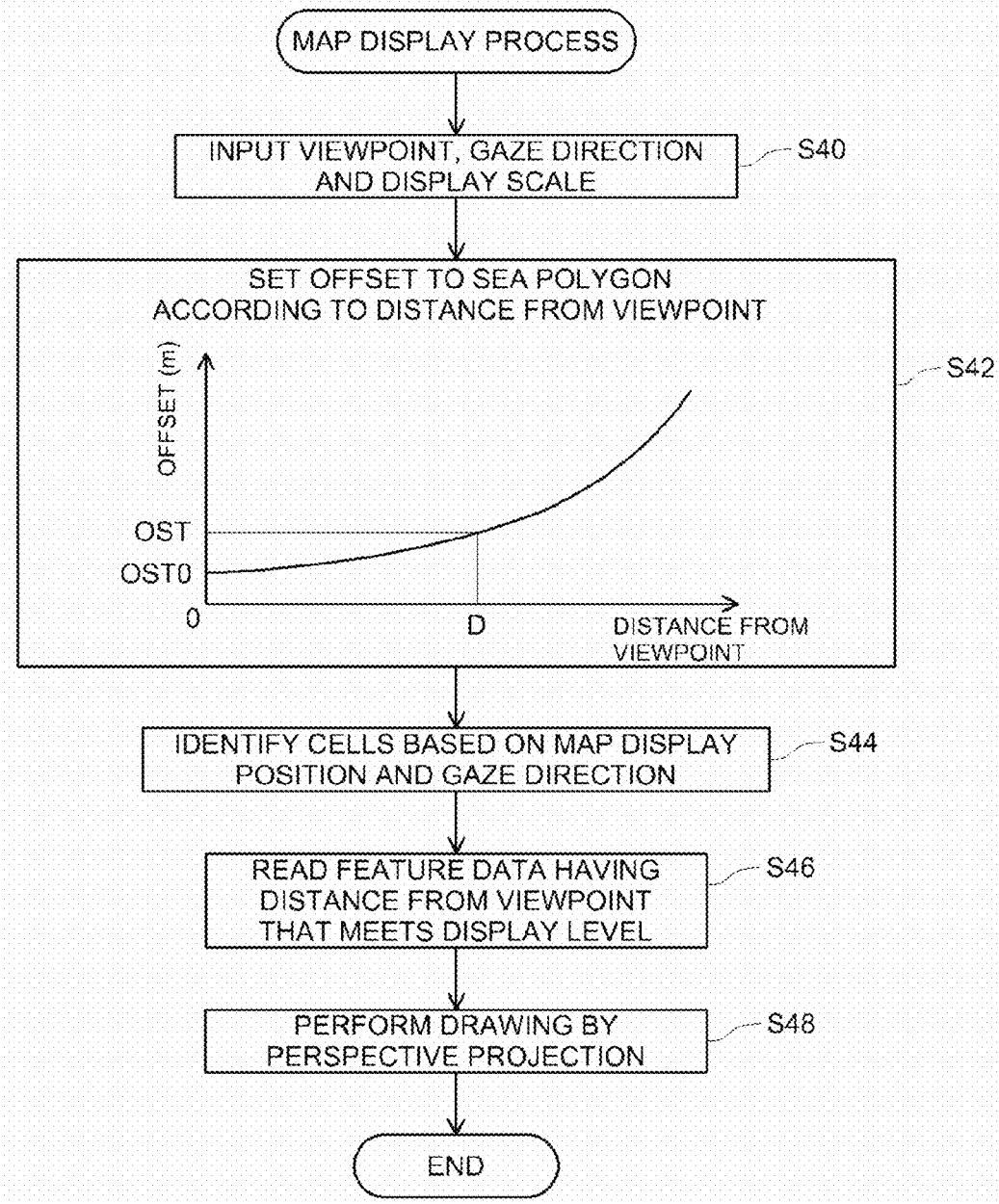
FIG. 8 is a flowchart of a map display process according to a modification.

FIG. 8 is a flowchart showing a map display process according to a modification. When the map display process is triggered, the CPU inputs the viewpoint, the gaze direction and the display scale (step S40). The procedure of the modification selects and uses only one level of map data according to the display scale.

The CPU sets an offset to a sea polygon according to the distance from the viewpoint (step S42). While the procedure of the embodiment sets the offset for each level, the procedure of the modification sets the offset for each point according to the distance from the viewpoint. An example of setting the offset is illustrated. In order to avoid Z-fighting in a closer area to the viewpoint, a predetermined offset OST0 is set even at the viewpoint position. The offset OST is set according to the distance D by a monotonically increasing function. At step S42, the CPU determines the distance D from the viewpoint with respect to each point on the sea polygon, calculates the offset OST by a specified function and adds the calculated offset OST to the height value of the sea polygon. This process is performed with respect to each point on the sea polygon.

Upon completion of the above process, the CPU identifies cells based on the map display position and the gaze direction (step S44), reads feature data having the distance from the viewpoint that meets the display level (step S46), and performs drawing by perspective projection (step S48). These processes are the same as those of the embodiment (FIGS. 5 and 6) and are thus not specifically described here. The modification uses the map data of a single level and accordingly does not need to clear the depth buffer. Like the embodiment, however, the procedure of the modification may concurrently use the map data of different levels for drawing.

The three-dimensional map display system of the embodiment described above draws a map with setting the larger offset for the distant area from the viewpoint and the smaller offset for the closer area to the viewpoint. This advantageously avoids the occurrence of Z-fighting from the close area to the distant area and also avoids a potential trouble, for example, the offset visible in the close area.

The embodiment concurrently uses the map data of multiple levels and thus eliminates the need to read detailed map data with respect to the distant view area. This provides the sufficiently detailed information for the near view area and uses the map data of the low data volume for the distant view area, thus enabling a map to be drawing efficiently.

Additionally, the embodiment not only stores the map data in the units of meshes but stores the map data in the units of cells as divisions of each mesh. This avoids unnecessary data from being read for displaying a map and reduces the time required for data reading to display a map.

The foregoing describes the embodiment of the invention.

The three-dimensional map display system of the invention may not necessarily have all the functions of the embodiment described above but may have only part of such functions. The three-dimensional map display system of the invention may have additional functions other than those described above.

The invention is not limited to the above embodiment but may be implemented by a variety of configurations within the scope of the invention. For example, parts configured by the hardware in the embodiment may be implemented by the software configuration, and vice versa.

The embodiment describes application of the offset between the ground surface and the sea polygon. The invention is, however, not limited to this embodiment but may be applied between a variety of polygons.

The invention is applicable to display a three-dimensional map with avoiding Z-fighting in the range from a close area to the viewpoint to a distant area.

What is claimed is:

1. A three-dimensional map display system comprising:
a display terminal that displays a three-dimensional map;
a memory that stores a map database including three-dimensional polygon data representing geography and a three-dimensional shape of each feature; and
a display controller that reads data from the memory and generates the three-dimensional map to be displayed on the display terminal, the display controller including:
an offset setting section that performs an offset process onto a first polygon and a second polygon both representing substantially horizontal planes and having an overlapping area therebetween, by shifting the first polygon and the second polygon relative to each other in a height direction so as to provide a height difference between the first polygon and the second polygon; and a drawing controller configured to draw the three-dimensional map by perspective projection viewed from a specified viewpoint position and in a specified gaze direction, using the three-dimensional polygon data read from the map database and the first and second polygons processed by the offset setting section, wherein the offset setting section shifts the first polygon and the second polygon such that the height difference therebetween when the first and second polygons are at a position farther from the viewpoint position of the perspective projection is greater than the height difference between the first and second polygons when the first and second polygons are at a position closer to the viewpoint position, thereby effectively suppressing Z-fighting in the overlapping area at the position farther from the viewpoint position in the three-dimensional map displayed on the display terminal.

2. The three-dimensional map display system according to claim 1, wherein in the map database, the three-dimensional polygon data is divided into meshes of a predetermined geographical size, and wherein the offset setting section shifts the first polygon and the second polygon mesh by mesh.

3. The three-dimensional map display system according to claim 2, wherein the offset setting section performs the offset process at mesh boundaries by decreasing an amount of the shift from a distant view area away from the viewpoint position toward a close view area close to the viewpoint position, and wherein the drawing controller draws a map by area having a same amount of the shift in a decreasing order of the amount of the shift, such that a new area is drawn over top of a previously drawn area regardless of a display depth of each area in the map.

4. The three-dimensional map display system according to claim 3, wherein the map database further includes map data for displaying the three-dimensional map, the map data has multiple levels of data each having a different degree of map details, wherein the drawing controller uses at least two levels of map data to draw a map, including a first level of map data having a lower degree of map details for a more distant view area away from the viewpoint position and a second level of map data having a higher degree of map details for a close view area closer to the viewpoint position, and wherein the offset setting section shifts the first polygon and the second polygon level by level before drawing the map.

5. The three-dimensional map display system according to claim 4, wherein the three-dimensional polygon data includes:
three-dimensional polygon data representing a ground surface; and
three-dimensional polygon data representing a water system which is to be drawn to entirely or partly overlaid on the ground surface, and wherein the offset setting section shifts a polygon of the water system to a higher position relative to a polygon of the ground surface.

6. The three-dimensional map display system according to claim 3, wherein the three-dimensional polygon data includes:
three-dimensional polygon data representing a ground surface; and
three-dimensional polygon data representing a water system which is to be drawn to entirely or partly overlaid on the ground surface, and wherein the offset setting section shifts a polygon of the water system to a higher position relative to a polygon of the ground surface.

7. The three-dimensional map display system according to claim 2, wherein the three-dimensional polygon data includes:
three-dimensional polygon data representing a ground surface; and
three-dimensional polygon data representing a water system which is to be drawn to entirely or partly overlaid on the ground surface, and wherein the offset setting section shifts a polygon of the water system to a higher position relative to a polygon of the ground surface.

8. The three-dimensional map display system according to claim 1, wherein the three-dimensional polygon data includes:
three-dimensional polygon data representing a ground surface; and
three-dimensional polygon data representing a water system which is to be drawn to entirely or partly overlaid on the ground surface, and wherein the offset setting section shifts a polygon of the water system to a higher position relative to a polygon of the ground surface.

9. A method for displaying a three-dimensional map performed by a computer, the computer including a map database that stores three-dimensional polygon data representing geography and a three-dimensional shape of each feature, the method comprising:

performing an offset process onto a first polygon and a second polygon both representing substantially horizontal planes and having an overlapping area therebetween, by shifting the first polygon and the second polygon relative to each other in a height direction so as to provide a height difference between the first polygon and the second polygon; and drawing the three-dimensional map by perspective projection viewed from a specified viewpoint position and in a specified gaze direction, using the three-dimensional polygon data read from the map database and the first and second polygons processed by the offset process, wherein the offset process comprises shifting the first polygon and the second polygon such that the height difference therebetween when the first and second polygons are at a position farther from the viewpoint position of the perspective projection is greater than a height difference between the first and second polygons when the first and second polygons are at a position closer to the viewpoint position, thereby effectively suppressing Z-fighting in the overlapping area at the position farther from the viewpoint position.

10. A non-transitory computer readable medium containing a computer program that causes a computer to display a three-dimensional map, the computer including a map database that stores three-dimensional polygon data representing geography and a three-dimensional shape of each feature, the computer program causing the computer to execute functions of:

performing an offset process onto a first polygon and a second polygon both representing substantially horizontal planes and having an overlapping area therebetween, by shifting the first polygon and the second polygon relative to each other in a height direction so as to provide a height difference between the first polygon and the second polygon; and drawing the three-dimensional map by perspective projection viewed from a specified viewpoint position and in a specified gaze direction, using the three-dimensional polygon data read from the map database and the first and second polygons processed by the offset process, wherein the offset process comprises shifting the first polygon and the second polygon such that the height difference therebetween when the first and second polygons are at a position farther from the viewpoint position of the perspective projection is greater than a height difference between the first and second polygons when the first and second polygons are at a position closer to the viewpoint position, thereby effectively suppressing Z-fighting in the overlapping area at the position father from the viewpoint position.

* * * * *